Figure 1:
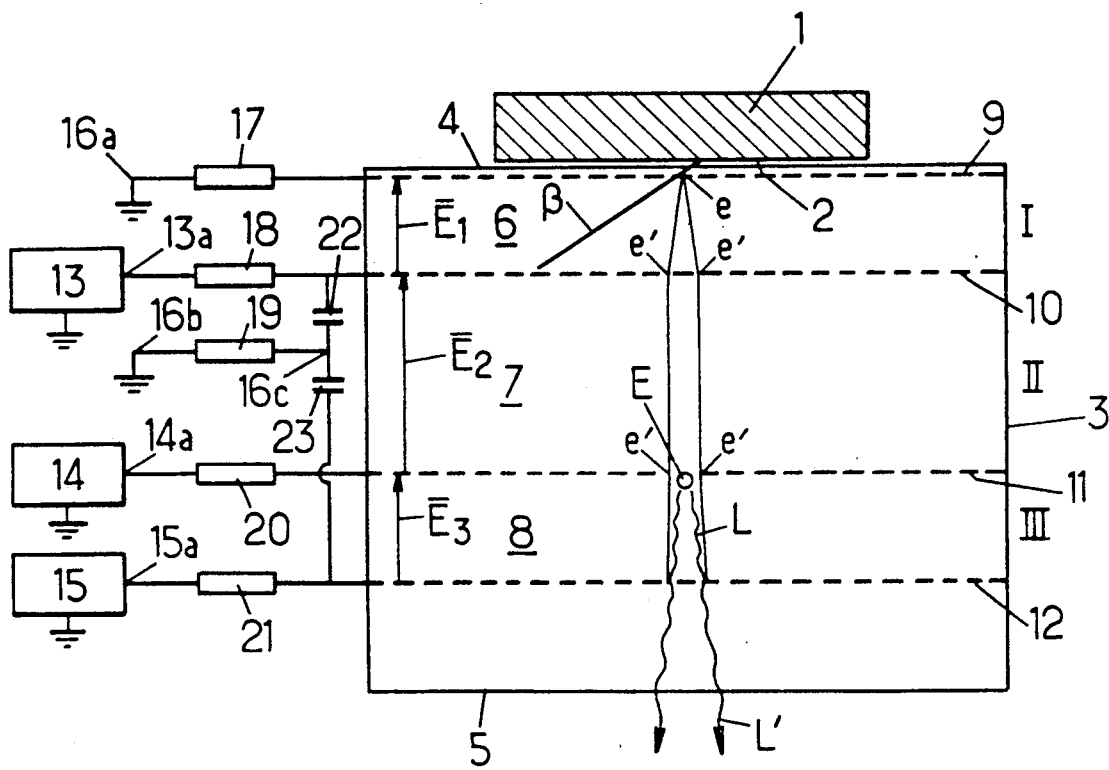
Figure 1:
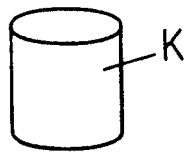

United States Patent [19]

Charpak

[11] Patent Number: 5,025,162

[45] Date of Patent: Jun. 18, 1991

[54] METHOD AND DEVICE FOR DETERMINING THE DISTRIBUTION OF βRAYS EMERGING FROM A SURFACE

[75] Inventor: Georges Charpak, Paris, France

[73] Assignee: Biospace Instruments, Paris, France

[21] Appl. No.: 514,437

[22] Filed: Apr. 25, 1990

[30] Foreign Application Priority Data

Apr. 27, 1989 [FR] France .................... 89 05605

[51] Int. Cl.$^5$ ............................................. G01T 1/185
[52] U.S. Cl. ............................... 250/385.2; 250/385.1
[58] Field of Search ........................... 250/385.2, 385.1

[56] References Cited

U.S. PATENT DOCUMENTS 3,717,766 2/1973 Allard et al. .................. 250/389
4,316,089 2/1982 Aoyama ..................... 250/385.2

FOREIGN PATENT DOCUMENTS 2111992 6/1972 France .

OTHER PUBLICATIONS

G. Peterson, G. Charpak, G. Melchart and F. Sauli, "The Multistep Avalanche Chamber as a Detector in Radiochromatography Imaging", *Nuclear Instruments and Methods*, 176 (1980), pp. 239–244.

G. Charpak, W. Dominik, J. P. Fabre, J. Gauden, V. Peskov, F. Sauli and M. Suzuki, "Some Applications of the Imaging Proportional Chamber," *IEEE Transactions on Nuclear Science*, vol. 35, No. 1 (Feb. 1988), pp. 483–486.

Primary Examiner—Constantine Hannaher
Attorney, Agent, or Firm—Larson & Taylor

[57] ABSTRACT

A method and device are disclosed for determining the distribution of the β rays emerging from a surface. The device comprises an enclosure (3) filled with a gas mixture having a first preamplification chamber (6) between two grids (9 and 10), a second transfer chamber (7) between two grids (10 and 11) and a third multiplication chamber (8) between two grids (11 and 12); as well as three DC voltage sources (13, 14 15); and an impeding assembly (22, 23, 17, 18, 19, 20 and 21).

7 Claims, 2 Drawing Sheets

METHOD AND DEVICE FOR DETERMINING THE DISTRIBUTION OF β RAYS EMERGING FROM A SURFACE

The present invention relates to the determination of the distribution of β rays emerging from the surface of a body, particularly of the inner layer, containing β ray emitting radio elements.

Numerous techniques, particularly in biology, biochemistry, medicine and chemistry, use the determination of the distribution of β rays emitted by the radio elements present in the bodies to be studied.

The oldest and most widely used techniques consist in applying a photographic film on the β rays emitting surface and to observe, after development, the darkening of the film caused by the β rays received thereby. But this technique requires very long exposure times, several days, even several weeks or even several months.

To speed up the measurements, a β ray detector may be used comprising an avalanche chamber containing a gas between two electrodes formed by parallel grids, one of which forms the anode and the other the cathode against which the surface to be observed is applied. In this chamber the β rays emitted by the surface release electrons by ionization of the gas between the electrodes and form avalanches which ionize some atoms of the gas. The atoms thus ionized produce a light emission. After brightness amplification by brightness amplifiers (necessary because of its low intensity), the light emission is detected by video cameras, particularly of the CCD (charge coupling device) type, which makes it possible to localize in the gas volume of the chamber the points of entry of the β rays emitted by the radio elements of the surface to be observed.

Such a technique is described in a document CERN-EP/88-165 of Nov. 25, 1988 by Messrs. CHARPAK, DOMINIK and ZAGANIDIS.

Although this technique makes it possible to determine the distribution of β rays coming from a surface more rapidly than the photographic method, on the other hand it requires costly equipment, particularly the costs of the high price of brightness amplifiers and of CCD type cameras. Also, the sensitivity of the CCD type cameras is not used to a maximum, because these cameras are particularly sensitive to visible light, whereas the light emitted by the avalanches of the device described in the above article is generally not concentrated in the visible spectral range and is of relatively low intensity which requires a light amplifier.

It is further known that in the chamber containing a gas between two parallel electrode grids between which a DC voltage A is applied, there exists a threshold value Vs of this voltage V (depending on the gas filling the chamber) from which, following ionization of the gas under the effect of a passage of ionizing particle, a spark is produced and this spark short-circuits the two electrodes.

Such a phenomenon may be used for constructing a detector or counter for detecting highly ionizing particles, such as α particles. Each particle causes a spark which short-circuits the electrode grids whilst stopping the detector for a short instance; then the latter is again ready for counting a new particle.

On the other hand, such a type of detector is very difficult to perfect for detecting the β particles which have a low ionizing power. It is very difficult to adjust the DC voltage V to a threshold Vs' such that only the β rays produce sparks which are detected, without reproduction of a spark in the ionizing chamber by the cosmic rays or by the electrons emitted by the electrode forming the cathode.

It has however been proposed to construct avalanche chambers, having several stages, so as to form β ray (and possibly slow neutron) detectors. For examples see the following articles:

PETERSON, CHARPAK, MELCHART and SAULI in Nuclear Instruments and Methods 176 (1980), p. 239–244; and CHARPAK, MELCHART, PETERSON and SAULI in IEEE Transactions on Nuclear Sciences, Vol. NS-28 No. 1, Feb. 1989, p. 849–851.

In this type of detector with a multistage structure, the following are provided:

a first preamplification stage which comprises a first chamber between two parallel electrode grids—a first grid of which forms the cathode against which the β ray emitting surface to be examined is applied and a second grid, biased positively with respect to the first one—between which a DC voltage is applied, capable of providing low gain preamplification, of the order of $10^3$ to $10^4$;

a second transfer stage which comprises a second chamber defined by auxiliary electrode grids; and a third multiplication stage which comprises a third chamber in which the electrons, which have passed through the second said grid of the first stage of the transfer stage, are again multiplied between two parallel electrode grids and give rise to avalanches which may be localized by different electronic means.

If the electric field between the two grids of the chamber of the third stage is such that the ions produced in the avalanche cannot return to the chamber of the first stage through the transfer stage because of auxiliary electrode grids subject to an appropriate pulse field, for a certain time the transfer of ions to the input cathode of the first chamber is prevented. Such a result is desired as such an ion might risk causing a new emission of electrons by this cathode and so a new avalanche in the third chamber, which would cause a permanent self-sustained discharge.

Such an arrangement with three stages or chambers, with pulsed electrode grids in the second stage, has the drawback of requiring adjusting means. Such adjusting means are difficult to control, for avoiding the return to the first chamber of ions resulting from the avalanches. This makes it possible however to increase the gain of the third chamber to a level such that visible sparks are produced there, but with the drawback that the sparks thus produced in the third chamber are relatively extended filaments. The observation of such filaments does not make possible a precise localization of the points at which the β rays emerge from the emissives to be observed, which is applied against the input cathode.

The object of the present invention is to overcome the above drawbacks of prior techniques by providing a simple method and device for very accurately determining the distribution of β rays emitted by a surface, advantageously by means of optical reading, without complicated adjustment means and without using a light detector.

For this purpose the invention provides:

on the one hand, coupling by electric impedances (capacitors, resistances and/or self-inductances) between stages of the detector; and on the other hand, an appropriate gas filling allowing us to obtain, in the multiplication stage, sparks in the form of localized brilliant points.

The object of the invention is first of all a method for determining the distribution of the $\beta$ rays emerging from a surface, which methods consists in causing these $\beta$ rays to pass through:

- a first substantial proportional preamplification stage, formed by a first chamber defined by two electrode grids, parallel to each other, between which the DC voltage is applied, in which the electrode grids forming the cathode is that against which said $\beta$ ray emitter surface is applied,
- a second transfer stage, formed by a second chamber disposed between that one of the two above electrode grids which forms the anode and a third electrode grid parallel to the latter and biased positively with respect thereto; and
- a third multiplication stage, formed by a third chamber disposed between this third electrode grid and a fourth electrode grid biased anodically by a DC voltage relatively to the third grid;
- these three chambers being filled with at least one gas;

and which is characterized in that on the one hand, impedance coupling is provided between these four electrode grids, and on the other hand, said at least one gas is chosen so that, in an automatic way through said impedance coupling, the sparks produced by multiplication in the third chamber cannot, under the effect of the return of ions through the transfer stage to the cathode of the first chamber, cause a permanent discharge, and in the sparks are in the form of brilliant localized points on the surface of the cathode thereof.

In the first stage, under the effect of the electric field created between these two electrode grids, an avalanche of electrons is produced. This avalanche is initiated preferably by the ionization electrons released in the gas contained in this first stage, close to the cathode grid thereof, by the $\beta$ rays which penetrate into this stage. In the second stage, the electrons of said avalanche are transferred from the first to the third stage.

Another object of the invention is to provide a device for implementing said method, comprising:

an envelope filled with at least one gas and which comprises a first proportional preamplification chamber, defined by a first electrode grid and a second electrode grid permanent to the first one;

a second transfer chamber, defined by said second electrode grid and a third electrode grid parallel thereto; and a third electrode grid parallel thereto; and a third multiplication chamber, defined by the third electrode grid and a fourth electrode grid parallel thereto;

a first DC voltage source, connected between the first and second electrode grid, the first one being biased so as to form with respect to the second a cathode for receiving substantially against it the $\beta$ ray emitting surface to be examined;

a second DC voltage source for biasing the third electrode grid positively with respect to the second electrode grid; and a third DC voltage source for biasing the fourth electrode grid positively with respect to the third electrode grid;

and characterized in that it further comprises a set of impedances, formed by capacitors, resistor and/or self inductance network, connected to said electrode grids, and in that said at least one gas is formed by at least a noble gas (particularly, argon, neon and/or helium) to which is added a small proportion of at least one organic gas (particularly triethylamine, tetramethylpentane and/or methylal).

It may be noted that the method and device of the invention make it possible to neutralize all the delayed secondary electron sources ejected by the cathode of the first stage.

The light which leaves the device, in fact produced by the bright localized points, can be observed by a camera (particularly a small aperture camera or the CCD type camera) or even with the naked eye.

The video camera may be connected directly to a computer.

Such a detector, which is relatively inexpensive and requires neither complicated adjustment, nor expensive observation equipment, has numerous applications, particularly:

formation of the image of the $\beta$ rays emitted by an emitting surface applied against the input face of the first chamber;

the counting, with a very low background noise, of the $\beta$ rays emitted by the samples comprising radio elements, even if their radioactivity is very low; in fact, the background noise of the detector is about bright light point or spot per minute and per $cm^2$, which makes it possible to detect practically without a noise the $\beta$ rays coming from a zone of 1 square mm.

A preferred embodiment of a detector comprising improvements in the invention will now be described, with reference to the accompanying:

FIG. 1 which shows a schematic first embodiment of the present invention and

Figure 2:
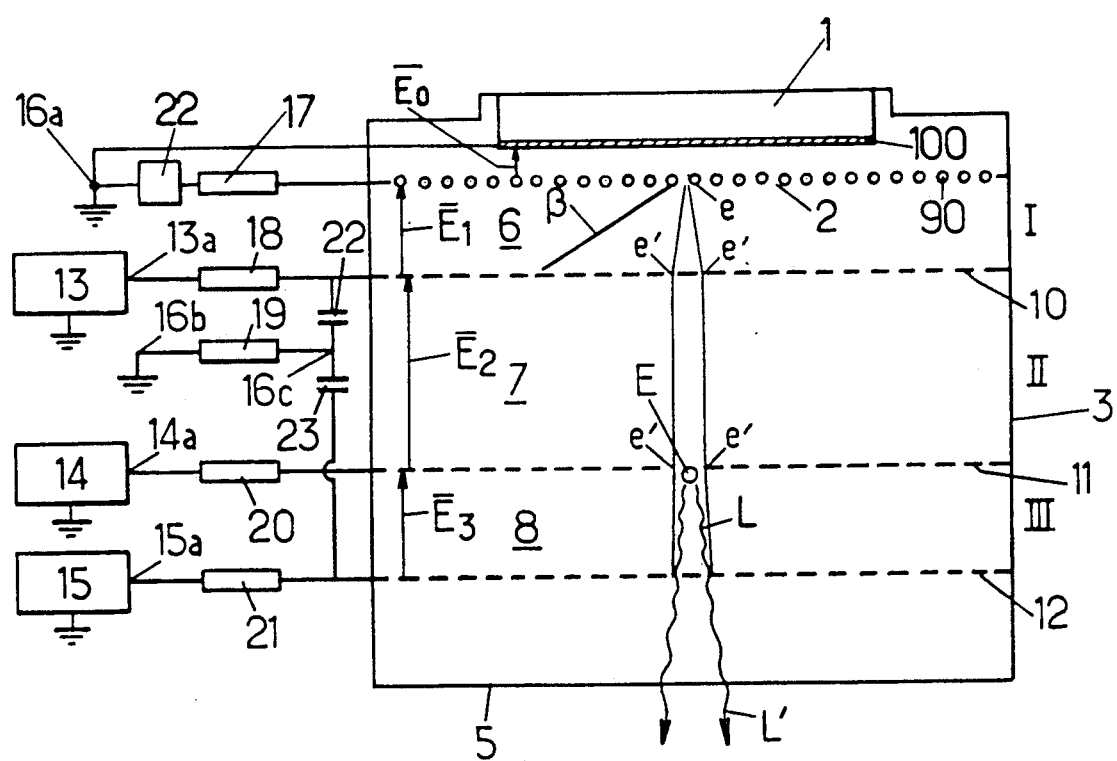
Figure 2:
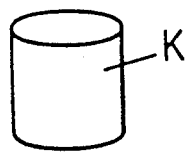

FIG. 2 which shows a schematic second embodiment of the present invention.

On FIG. 1, at 1 has been shown a body comprising radio elements and having a substantially flat surface 2 which emits $\beta$ rays (references $\beta$ in the figure) whose distribution is to be determined.

The detector as such comprises an envelope 3 with an input face 4 transparent to the $\beta$ rays. Input face 4 is formed for example by an aluminized "MYLAR" foil 6 microns thick, against which surface 2 is applied. The detector also includes an output face 5 formed by an optical window allowing light in the visible range to pass through.

This enclosure comprises three chambers 6, 7 and 8 forming three successive stages I, II and III.

The first chamber 6 of stage I is a chamber for preamplification of the electrons e formed on the entry into chamber 3 of $\beta$ rays having passed through the input face 2, with a gain of about $10^3$ to $10^4$. Chamber 6 is defined by a first electrode grid 9 and a second electrode grid 10 parallel to, separated by a gap of 4.3 mm.

The second chamber 7 of stage II forms a transfer chamber for the multiplied electrons e and is defined by the second electrode grid 10 and a third electrode grid 11 parallel thereto, spaced apart by 12 mm.

The third chamber 8 forming the third stage III is a multiplication or ionization chamber in which the transferred electrons e' cause, at the level of the third grid 11, and particularly at the intersection points of the wires forming this grid, sparks E which have the form of bright light points. The light L coming from these light points propagates through this chamber 8 and passes through the optical window forming the output face 5. This chamber 8 is defined by the third electrode grid 11 and the fourth electrode grid 12 parallel thereto, spaced apart by 5 mm.

Three DC volt sources 13, 14 and 15 apply, to points 13a, 14a and 15a respectively, positive DC voltages $+V_1$, $+V_2$ and $+V_3$ respectively with respect to ground, to which points 16a and 16b are also connected.

Resistors 17, 18, 19, 20 and 21, having values of $R_1$, $R_2$, $R_3$, $R_4$ and $R_5$ respectively, are connected between point 16a and electrode grid 9, point 13a and electrode grid 10, point 16b and point 16c, point 14a and electrode grid 11, and the point 15a and the electrode grid 12, respectively. Two capacitors 22 and 23 of capacities $C_1$ and $C_2$ respectively, are connected the first one between point 16c and grid 10 and the second between point 16c and grid 12. The assembly 17, 18, 19, 20, 21, 22, 23 forms an impedance regulation device automatically preventing the production and amplification of secondary electrons produced in particular by the return to the cathode grid 9 of the positive ions emitted by a spark E in the third chamber 8.

Finally, the envelope 3 is filled, substantially at atmospheric pressure, with a gas mixture comprising a noble gas, such as argon, neon or helium, and an organic gas, such as triethylamine, tetramethylpentane or methylal.

In this example a mixture of argon and 2% of triethylamine has in particular been used. The following values for the voltage, resistors and capacitors, respectively involved, (in megohms and picofarads), are given by way of non-limiting examples:

| $V_1$ | $V_2$ | $V_3$ | $R_1$ | $R_2$ | $R_3$ | $R_4$ | $R_5$ | $C_1$ | $C_2$ |
|---|---|---|---|---|---|---|---|---|---|
| 3125 | 4000 | 7325 | 2 | 100 | 2 | 10 | 100 | 470 | 470. |

The electrode grids, particularly the third grid at the level of which the sparks are produced in the form of bright localized points, are formed by metal wires disposed in two directions perpendicular to each other. The wires have a diameter of 10 to 200 microns, for example about 50 microns. Two successive wires are spaced apart from each other by a distance of 100 to 2000 microns, for example about 500 microns, in each direction.

In the figure, there has also been shown the direction of the electric fields $E_1$, $E_2$ and $E_3$ produced by the assembly of the voltage sources, resistors and capacitors.

The light L', essentially in the visible range, which passes through the output face 5, can be observed by the naked eye or by means of a camera K. Camera K can be, for example, a small aperture photographic camera or a CCD type video camera, without requiring a light amplifier.

The operation of the detector, which has just been described with reference to the two figures is the following:

A $\beta$ ray emerging from surface 2 of the radio-active body 1 passes through the input face 4 and appears in enclosure 3, at the level of the first electrode grid 9 forming the cathode, in the form of one or more ionization electrons e which are amplified or multiplied in the first chamber 6 to give a few thousands electrons e' which move towards the electrode grid 10 forming the anode, under the first electric field $E_1$.

It will be noted that it is the electron e closest to cathode 9, namely the one from the $\beta$ ray at its input, which gives the largest avalanche or cloud electrons e' and which will produce the succession of the pheonomena described hereafter. This is what will make it possible to localize accurately the $\beta$ ray arriving from the surface 2 and passing through the face 4 at the level where it strikes the electrode grid 9.

A fraction of the electrons e' (about 10%) then passes through the second electrode grid 10 and moves, under the effect of the electric field $E_2$, towards the third electrode grid 11 while passing through the transfer chamber 7.

Finally, the electrons e' pass through grid 11 and, after a second multiplication at the level thereof and more precisely at the intersection of the wires forming this grid, cause discharges or sparks in the form of bright light points E. It will be appreciated that in prior spark detectors, a spark was obtained formed by a filament connecting together the two electrode grids defined in the third chamber.

It should be noted that this light point or cathode spot E is situated exactly in a line (in the direction perpendicular to the parallel electrode grids) with the impact on the cathode forming electrode grid g of all the $\beta$ ray be emitted by surface 2 and represented by electron e, which makes it possible to accurately localize this impact. Furthermore the light L emitted is in the visible range, and easy to observe with the naked eye or to photograph with an ordinary film camera and/or to film with a video camera, for example of CCD type, possibly connected to a computer (not shown).

The avalanche forming light point E in the third chamber 8 causes an electric pulse between the electrode grids 11 and 12. This pulse, through the impedance networks 17, 18, 19, 20, 21, 22, 23, reduces the gain in the first chamber 6 between electrode grids 9 and 10 by applying a negative voltage pulse to the electrode grid 10. This prevents amplification of secondary electrons produced by the impact on the electrode grid 9 of positive ions generated by spark E, and so ultimately emission of electrons by this cathode forming electrode grid.

Possiblly, if the $\beta$ rays emitted by surface 2 of body 1 are not very penetrating (for example if body 1 comprises tritium as radio element), it is possible to make this surface 2 conductive by evaporating thereon a thin conducting layer and use this surface 2 for forming the assembly constituted by the input face 4 and cathode 9 of the detector.

In case $\beta$ rays emitting surface 2 is introduced into the enclosure so as to operate as a cathode, as previously mentioned, it is appropriate to make it conductive through a thin conducting coating layer 100, such as gold for example.

It is nevertheless possible to overcome the drawback of such an operation by placing said emitting surface 2 back at cathode 90, as shown at FIG. 2, with cathode 90 being transparent to electrons.

In such a case, as shown in FIG. 3, cathode 90 may consist of parallel wires of diameter comprised between 20 and 60 μm, with two adjacent wires being spaced apart from one another from 300 to 600 μm. Cathode 90 may consist of knitted wires constituting a grid or of an electro-eroded grid.

Preferably the thin conducting layer 100 of body 1 is placed spaced apart back from cathode 90 with a distance d comprised between 1 mm and 5 mm. A bias electric field $\overline{E0}$ is generated with $\overline{E0} \leq 0.2 \times E1$ between the thin conducting layer 100 and cathode 90. Bias electric field $\overline{E0}$ is of feeble magnitude with respect to electric field $\overline{E1}$ established into first proportional preamplification chamber I.

Most of the electrons generated through ionization in between body 1 and cathode 90 are transferred into the first proportional preamplification chamber I along the lines of force of the electric field, and penetrate into the first proportional preamplification chamber I with an accuracy of 99%.

More particularly in the case where the emitting radio element contained in body 1 is tritium, the electrons of which have a penetration length about 100 μm into a mixture essentially made of xenon under atmospheric pressure, such a penetration length is to be reduced to a few tens microns under higher pressure. Thus, electrons produced by ionisation are generated very near the thin conducting layer 100, and after their transfer along the lines of force they come to first proportional preamplification chamber I. They thereby constitute true images of β rays emitted by the thin conducting layer 100 of body 1, with a distortion corresponding to the electric field $\overline{E0}$ lines of force paths. Such paths are easy to compute with reference to the electrostatic known relations. Corresponding computing thus allows an image cathode without distortion of the actual distribution of β rays as emitted by body 1 to be obtained.

As shown at FIG. 2 in a non-limiting way, in order to generate the electric field $\overline{E0}$, the emitting surface 2 can be coated with a thin conducting coating 100, made of gold, thus allowing a potential V0 to be applied with respect to cathode 90. As an example potential, V0 may have a value of 300 Volts.

In operation, emitting surface of body 1 is placed spaced apart from cathode 90 with a distance d comprised between 1 and 5 mm. Electric field $\overline{E0}$ is thereafter generated between thin conducting layer 100 and cathode 90 so as to establish a transfer field for the β rays electrons emitted towards the first proportional preamplification chamber I.

For such a purpose, thin coating 100 can be set to the ground potential, cathode 90 being set to a potential of 300 V through a DC generator 22. Potential of subsequent grids 10, 11, 12 is this shifted accordingly to corresponding values V1+300 Volts; V2+300 Volts; and V3+300 Volts.

With respect to the utilization of naked thin conducting coating 100 as a cathode within the first proportional preamplification chamber, one of the most important advantages in utilizing cathode 90 appears to consist of the fact that the device is no longer sensitive to roughness and asperities of the emitting surface 2.

The embodiment of the device of the invention as shown at FIG. 2 is more particularly directed to bodies or samples 1 of great dimensions, in case of measurement and establishment of cross section views of entire animals for example.

As is evident, the invention is in no way limited to the modes of application and embodiments which have been more especially envisaged; it embraces, on the contrary, all variants thereof.

I claim:

1. Method for determining a distribution of β rays emerging from a surface,
    which consists in causing these β rays to pass through:
    a first substantially proportional preamplification stage formed by a first chamber defined by first and second electrode grids parallel to each other and between which a DC voltage is applied, in which the first electrode grid forms a cathode and said β ray emitting surface is applied thereagainst;
    a second transfer stage formed by a second chamber disposed between the second electrode grid which forms an anode and a third electrode grid parallel to the second electrode grid and biased positively with respect thereto; and
    a third multiplication stage formed by a third chamber disposed between the third electrode grid and a fourth electrode grid biased anodically by means of a DC voltage relatively to this third electrode grid;
    these three chambers being filled with at least one gas;
    and which is characterized in that
    on the one hand, impedance coupling is provided between these four electrode grids, and
    on the other hand, said at least one gas is chosen so that in an automatic way due to said impedance coupling the sparks produced by multiplication in the third chamber cannot, under the effect of the return of ions through the transfer stage to the first electrode grid of the first chamber cause a permanent discharge, and in that said sparks are in the form of brilliant localized points on a surface of the first electrode grid.

2. Method according to claim 1, characterized in that at least one gas is formed by at least a noble gas to which is added a small proportion of at least one organic gas.

3. Device for determining a distribution of β rays emerging from a surface comprising:
    an enclosure filled with at least one gas and which comprises:
        a first proportional preamplification chamber defined by a first electrode grid and a second electrode grid parallel to the first one;
        a second transfer chamber defined by said second electrode grid and a third electrode grid parallel to said second electrode grid; and
        a third multiplication chamber defined by the third electrode grid and a fourth electrode grid parallel to said third electrode grid;
    a first DC voltage source connected between the first and second electrode grids, the first electrode grid being biased so as to form, with respect to the second electrode grid, a cathode for receiving substantially against said first electrode grid the β ray emitting surface;
    a second DC voltage source for biasing the third electrode grid positively with respect to the second electrode grid; and a third DC voltage source for biasing the fourth electrode grid positively with respect to the third electrode grid;

and characterized:

in that said device further comprises a set of impedances, formed by a network of capacitors, resistors and/or self inductances, connected to said electrode grids, and in that said at least one gas is formed by at least a noble gas to which a small proportion of at least one organic gas is added.

4. Device according to claim 3, characterized in that the noble gas is chosen from argon, neon and helium, whereas the organic gas is chosen from triethylamine, tetramethylpentane and methylal.

5. Device according to claim 3, characterized in that the electrode grids are formed by metal wires having a thickness of about 10 to 200 microns, spaced apart by a distance of about 100 to 2000 microns, and disposed in two directions perpendicular to each other.

6. Device according to claim 3, characterized by said surface facing the first electrode grid being provided with a conducting layer and placed spaced apart from the first electrode grid by a distance comprised between 1 mm and 5 mm, a bias electric field $\overline{E0}$ being generated between said conducting layer and first electrode grid with $\overline{E0} \leq 0.2 \times \overline{E1}$, where $\overline{E1}$ is the field between the first and second electrode grids, so as to establish a transfer field for the electrons of said $\beta$ rays emitted towards said first proportional preamplification chamber.

7. Device according to claim 6, characterized by said conducting layer being set at a ground potential, said first electrode grid being set at a DC potential of 300 V, and corresponding potentials of subsequent grids being shifted accordingly.

* * * * *